United States Patent
Balasaygun et al.

(10) Patent No.: US 9,094,426 B2
(45) Date of Patent: Jul. 28, 2015

(54) METHOD FOR TELECOMMUNICATIONS DEVICE SYNCHRONIZATION

(75) Inventors: Mehmet C. Balasaygun, Freehold, NJ (US); John Buford, Princeton, NJ (US); Venkatesh Krishnaswamy, Holmdel, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 12/622,970

(22) Filed: Nov. 20, 2009

(65) Prior Publication Data

US 2011/0124327 A1  May 26, 2011

(51) Int. Cl.
*G06F 15/16* (2006.01)
*H04L 29/08* (2006.01)
*H04M 1/253* (2006.01)

(52) U.S. Cl.
CPC ............ *H04L 67/1095* (2013.01); *H04L 67/34* (2013.01); *H04M 1/2535* (2013.01)

(58) Field of Classification Search
CPC . G06F 9/45558; G06F 9/45533; G06F 9/545; H04L 67/1095; H04L 41/0893; H04L 67/08
USPC ............. 709/203, 247, 248, 223, 226; 718/1, 718/104; 370/401, 331
See application file for complete search history.

(56) References Cited

U.S. PATENT DOCUMENTS

| | | | |
|---|---|---|---|
| 6,868,451 B1 * | 3/2005 | Peacock .................... | 709/231 |
| 7,439,937 B2 * | 10/2008 | Ben-Shachar et al. ........... | 718/1 |
| 7,555,522 B2 | 6/2009 | Klassen et al. | |
| 2003/0074451 A1 | 4/2003 | Parker et al. | |
| 2003/0204708 A1 * | 10/2003 | Hulme et al. ................ | 713/1 |
| 2004/0127251 A1 | 7/2004 | Thakkar et al. | |
| 2005/0138124 A1 | 6/2005 | Klassen et al. | |
| 2005/0198029 A1 * | 9/2005 | Pohja et al. ................... | 707/8 |
| 2006/0252464 A1 | 11/2006 | Vander Veen et al. | |
| 2006/0291481 A1 | 12/2006 | Kumar | |
| 2007/0088762 A1 | 4/2007 | Harris et al. | |
| 2007/0168953 A1 | 7/2007 | Diez et al. | |
| 2007/0171921 A1 | 7/2007 | Wookey et al. | |
| 2007/0189520 A1 | 8/2007 | Altberg et al. | |
| 2008/0005239 A1 | 1/2008 | Podl | |
| 2008/0318616 A1 | 12/2008 | Chipalkatti et al. | |
| 2009/0036111 A1 * | 2/2009 | Danford et al. ............ | 455/419 |
| 2009/0059965 A1 * | 3/2009 | Lin et al. ................... | 370/509 |
| 2009/0187854 A1 | 7/2009 | Murtagh | |
| 2009/0217263 A1 * | 8/2009 | Gebhart et al. ................ | 718/1 |
| 2009/0249332 A1 * | 10/2009 | Hoehle et al. ................. | 718/1 |
| 2010/0017482 A1 | 1/2010 | Piccinini et al. | |
| 2010/0064228 A1 * | 3/2010 | Tsern ........................ | 715/740 |
| 2010/0074155 A1 | 3/2010 | Park et al. | |
| 2010/0131625 A1 * | 5/2010 | Dehaan et al. ............... | 709/221 |
| 2010/0211769 A1 | 8/2010 | Shankar et al. | |

(Continued)

OTHER PUBLICATIONS

General Purpose Hardware Abstraction Layer for Multiple Virtual Machine in Mobile Devices, Lee, Sang-Main, Feb. 15-18, 2009, IEEE, ICACT 2009.

*Primary Examiner* — Hitesh Patel

(57) ABSTRACT

A method is provided in which a first telecommunications terminal receives an indication of a characteristic of a first system software that is executing on a second telecommunications terminal. The first terminal identifies a second system software that possesses the characteristic. Then, the first terminal launches an instance of the second system software.

14 Claims, 11 Drawing Sheets

(56) References Cited

U.S. PATENT DOCUMENTS

| | | |
|---|---|---|
| 2010/0235523 A1 | 9/2010 | Garcia et al. |
| 2010/0241483 A1 | 9/2010 | Haynes et al. |
| 2010/0330961 A1 | 12/2010 | Rogel |
| 2011/0003585 A1 | 1/2011 | Wang et al. |
| 2011/0010710 A1* | 1/2011 | Thrush et al. ............... 718/1 |
| 2011/0098089 A1 | 4/2011 | Irie et al. |

* cited by examiner

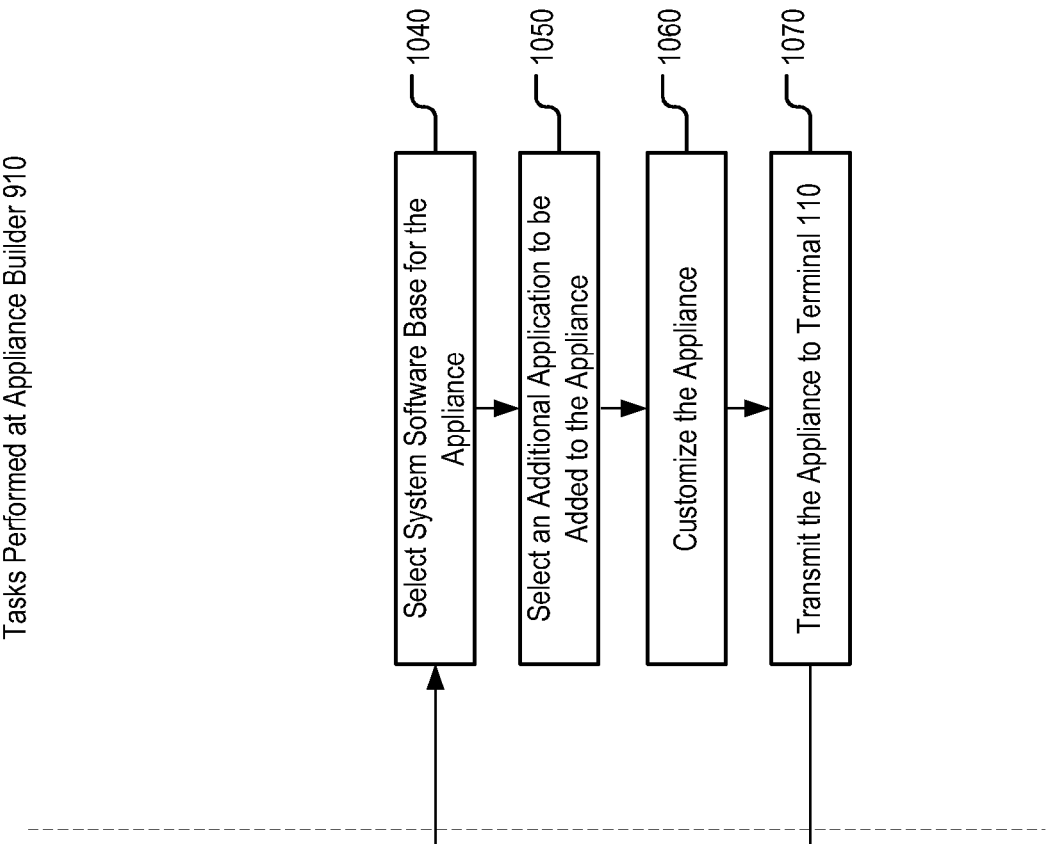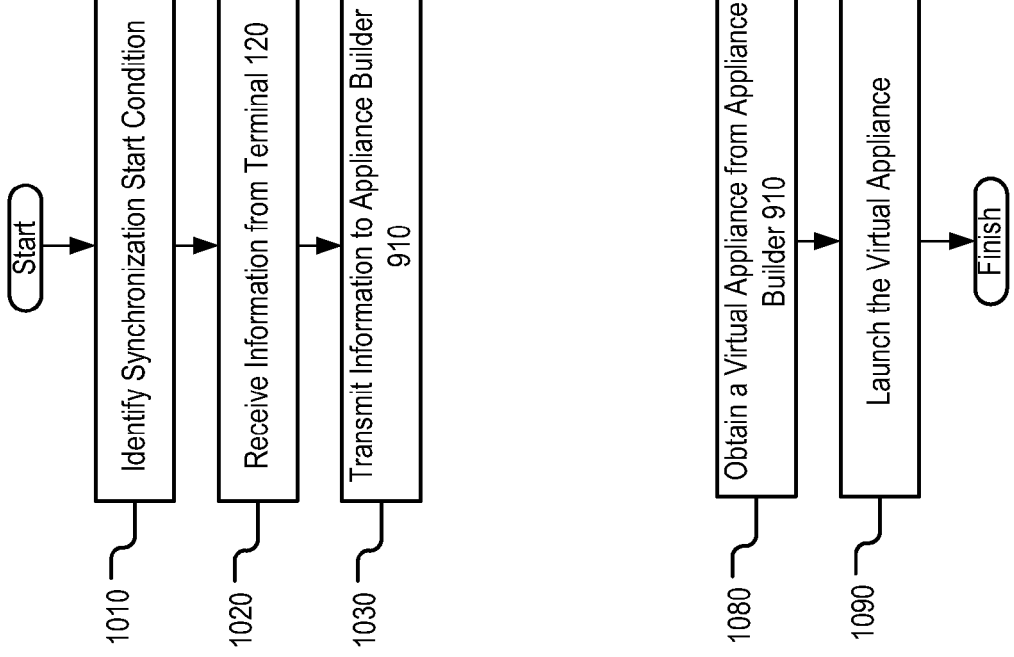
Figure 10

METHOD FOR TELECOMMUNICATIONS DEVICE SYNCHRONIZATION

FIELD OF THE INVENTION

The present invention relates to telecommunications in general, and, more particularly, to device synchronization.

BACKGROUND OF THE INVENTION

Telecommunications device synchronization is the process of establishing consistency among data stored on two telecommunications terminals. For example, when a user synchronizes the user's primary cellular telephone with a backup cellular telephone, the address book and call logs of the primary telephone are copied to the backup device. After the synchronization is complete, the address books on the two devices are identical and the user has access to the same information on either device.

However, a drawback of present synchronization techniques is that they are limited to ensuring data consistency only. This drawback affects users in two ways. First, two telephones may have different software applications installed on them. For example, a calendar application may be available on the primary telephone, but not on the backup telephone. When this is the case, the functionalities of the two telephones differ and the user is going to be put at disadvantage when he or she uses the backup telephone despite the fact that the backup telephone is synchronized with the primary telephone.

Second, the user interface of the primary telephone may differ from the user interface of the backup telephone. In general, users become accustomed to the way in which different menus are laid on their telephones. When users have to switch between different interfaces they feel inconvenienced. Therefore, despite of the synchronization, a user may still be inconvenienced by different interfaces on the primary and backup cellular telephones.

SUMMARY OF THE INVENTION

The present invention addresses the drawback of the prior art by providing a method for synchronization which achieves partial or full consistency between the software environments of two telecommunications terminals. In accordance with the present invention, a first telecommunications terminal receives an indication of a characteristic of a first system software that is executing on a second telecommunications terminal. The first terminal identifies a second system software that possesses the characteristic. Then, the first terminal launches an instance of the second system software. For the purposes of this Specification, a "characteristic of system software" is any item of information concerning a system software or a system software instance.

For example, and without limitation, the first terminal can receive an indication that the second terminal is running an instance of version 2.1 of the Android™ operating system and itself start an instance of the same version of the operating system. As another example, the first terminal can receive an indication that the second terminal is executing an operating system that supports the .Net framework and start any operating system that supports the .Net framework.

In a first embodiment of the present invention, the first telecommunications terminal receives the value of a configuration setting of the first system software. The first terminal then sets the value of a configuration setting of the second system software to a new value. The new value depends on the received value. For example, the first terminal may receive information about the screen resolution of the second terminal and set its own screen resolution to be the same. In this way, the screen of the first terminal is able to display the same quality graphics as the second terminal.

In a second embodiment of the present invention, the first terminal receives an indication of a characteristic of software application that is executing on the second terminal and launches an application that possesses the same characteristic. For example, the first terminal can receive an indication that the second terminal has Microsoft Word™ installed on it and launch an instance of Microsoft Word. As another example, the first terminal can receive an indication that the second terminal has a word processor installed on it and launch an instance of any word processor without regard to the brand of the launched software. For the purposes of this Specification, the term "characteristic of software" is any item of information concerning a software application or a software application instance.

In a third embodiment of the present invention, the first telecommunications terminal interacts with a virtual appliance builder to request a virtual appliance which provides a software environment that resembles the software environment of the second telecommunications terminal. When the first terminal receives the virtual appliance, it executes it by using virtualization software. A benefit of this embodiment is that the device synchronization can be achieved quickly and effectively. In this arrangement, the bulk of processing work is delegated to the virtual appliance builder—an external server—which has more processing power and is better suited for performing complex tasks.

In a fourth embodiment, the present invention selects the system software whose hardware requirements are best suited for the hardware resources available to the first terminal. In the same way, the fourth embodiment selects a software application which possesses the requisite characteristic and whose software requirements are most suitable for the first terminal.

It should be noted that the four embodiments are provided for exemplary purposes only and they do not reflect the full scope of the claimed subject matter.

BRIEF DESCRIPTION OF THE DRAWINGS

FIG. 10 depicts a flowchart of the execution of the salient tasks associated with the operation of the illustrative embodiment of the present invention.

DETAILED DESCRIPTION

Figure 1:
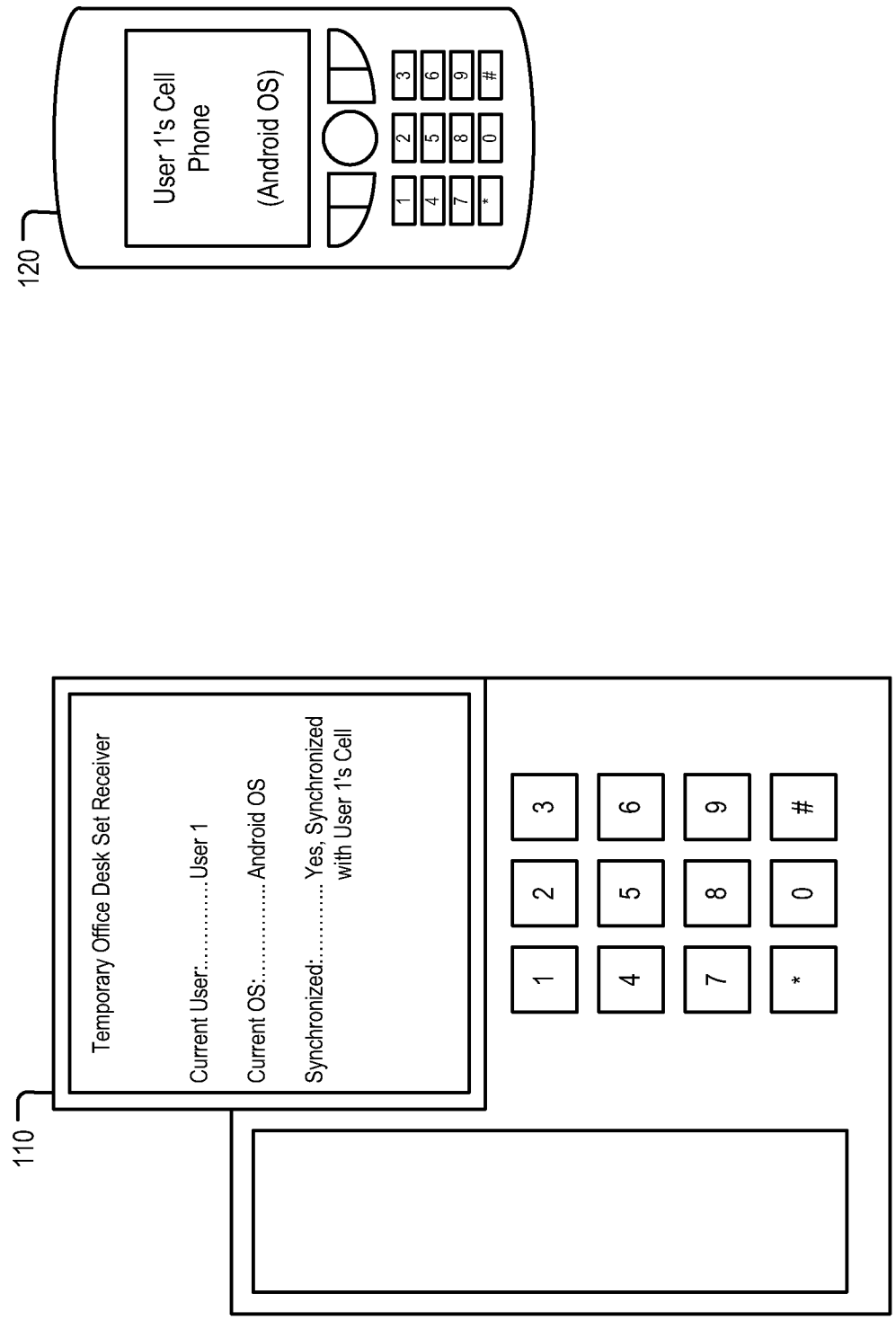
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises terminal 110 and terminal 120.

Terminal 110 is a desk set telephone receiver capable of running two or more operating systems in a virtualized fashion. In accordance with the illustrative embodiment of the present invention, terminal 110 is capable of voice telecommunications, but it will be clear to those skilled in the art, after reading this disclosure, how to make and use alternative embodiments of the present invention in which terminal 110 has both a voice and video capability. Furthermore, it will be clear to those skilled in the art, after reading this disclosure, how to make and use alternative embodiments of the present invention in which terminal 110 is another type of telecommunications device (e.g. cellular telephone, 2-way radio, portable digital assistant, desktop, etc.). Terminal 110 is synchronized with terminal 120 to execute system software that shares at least one common characteristic with the system software executed by terminal 120.

Terminal 120 is a mobile telephone receiver. It will be clear to those skilled in the art, after reading this disclosure, how to make and use alternative embodiments of the present invention in which terminal 120 is another type of telecommunications device (e.g. cellular telephone, 2-way radio, portable digital assistant, soft phone, desktop computer, desk set telephone receiver, etc.).

In accordance with the illustrative embodiment of the present invention, terminal 120 supports the Session Initiation Protocol (SIP). Terminal 120 is registered as an endpoint for a Session Imitation Protocol (SIP) uniform resource identifier (URI) on a Session Initiation Protocol (SIP) network and uses location services provided by registrar 220. Although, in accordance with the illustrative embodiment of the present invention, terminal 120 is registered on a Session Initiation Protocol (SIP) network, it will be clear to those skilled in the art, after reading this disclosure, how to make and use alternative embodiments of the present invention in which terminal 120 is registered on another telecommunications network, such as, for example, and without limitation, a cellular network, the Public Switched Telephone Network (PSTN), etc.

Figure 2:
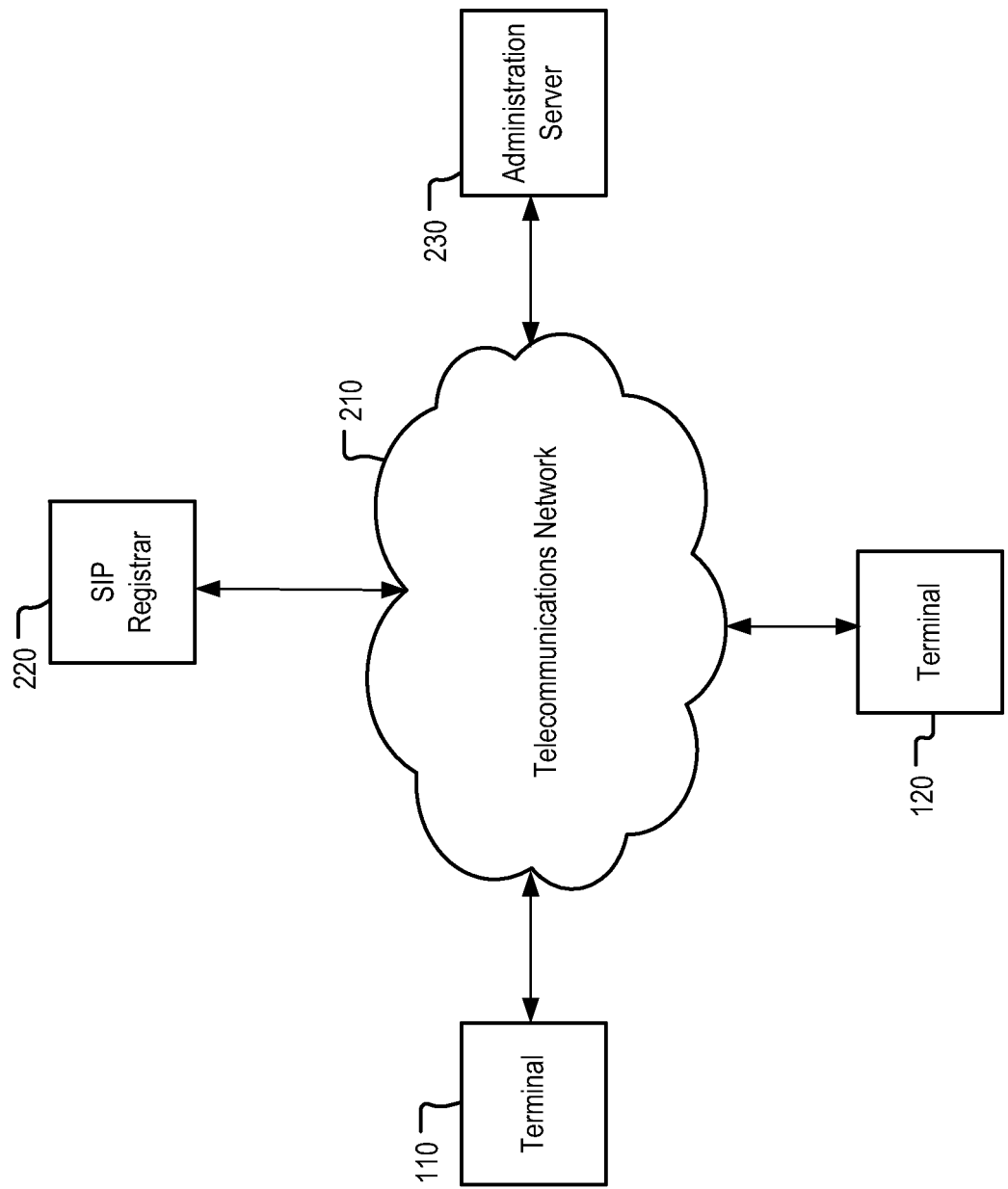
FIG. 2 depicts a schematic diagram of the salient components of the illustrative embodiment of the present invention.

FIG. 2 depicts a schematic diagram of the salient components of the illustrative embodiment of the present invention. The illustrative embodiment comprises terminal 110, terminal 120, server 230, registrar 220, and telecommunications network 210.

Telecommunications network 210 transports signals between terminal 110, terminal 120, registrar 220, and server 230. In accordance with the illustrative embodiment of the present invention, telecommunications network 210 is the Internet, but it will be clear to those skilled in the art, after reading this disclosure, how to make and use alternative embodiments of the present invention in which telecommunications network 210 is any type of telecommunications network (e.g. local area network, the Public Switched Telephone Network, SONET, ATM, cellular network, etc.).

Registrar 220 is a Session Initiation Protocol (SIP) registrar. In accordance with the illustrative embodiment of the present invention, registrar 220 provides location services to terminal 120.

Server 230 is an administration server used for remotely managing terminal 120. Server 230 stores a data record which contains information concerning terminal 120. In accordance with the illustrative embodiment of the present invention, the record contains information about a characteristic of system software 340 and a characteristic of application 352. However, it will be clear to those skilled in the art, after reading this disclosure, how to make and use alternative embodiments of the present invention in which the data record contains any information concerning terminal 120, such as, for example, and without limitation, configuration information about system software 340, configuration information about application 352, personal data of the user of terminal 120, etc.

Figure 3:
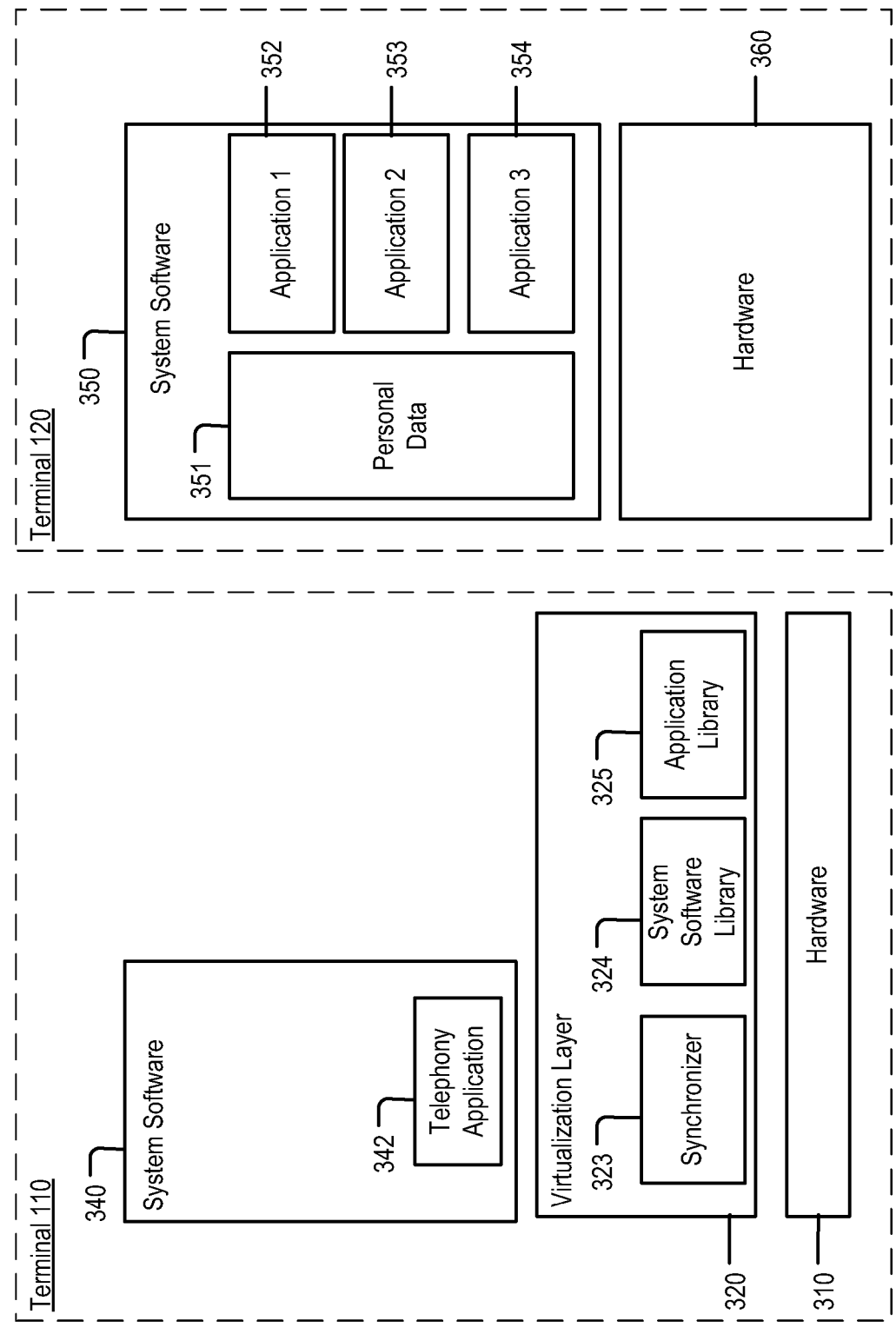
FIG. 3 depicts a schematic diagram of the salient components of the illustrative embodiment of the present invention.

FIG. 3 depicts a schematic diagram of the salient components of the illustrative embodiment of the present invention. The illustrative embodiment of the present invention comprises system software 340, virtualization layer 320, hardware 310, telephony application 342, synchronizer 323, system software library 324, application library 325, software 350, hardware 360, personal data 351, application 352, application 353, and application 354.

FIG. 3 depicts terminals 110 and 120 before they are synchronized.

Hardware 310 is the electronic components that comprise terminal 110, such as, for example, and without limitation, processor (single-core or multi-core), memory, transceiver, network interface, display, sound interface, video interface, etc. Hardware 310 is capable of executing system software and one or more telephony applications. It will be clear to those skilled in the art how to make and use hardware 310.

Virtualization layer 320 is a software layer that facilitates the sharing of the resources of hardware 310 by multiple system software images. In accordance with the illustrative embodiment of the present invention, virtualization layer 320 is an OKL4 micro kernel, but it will be clear to those skilled in the art, after reading this disclosure, how to make and use alternative embodiments of the present invention in which virtualization layer 320 is any other Type 1 hypervisor (e.g. Xen™, VMware ESX Server™, etc.) or any other hosted virtual machine (e.g. QEMU™, VMware Workstation™, etc.).

Synchronizer 323 is a software module responsible for coordinating the synchronization of terminals 110 and 120. Although, in accordance with the illustrative embodiment of the present invention, synchronizer 323 is part of virtualization layer 320, it will be clear to those skilled in the art, after reading this disclosure, how to make and use alternative embodiments of the present invention in which synchronizer 323 is executing independently of virtualization layer 320 such as, for example, and without limitation, as a software application inside system software 340, as a software application executing directly on top of hardware 310 (e.g. similar to a BIOS), and others. Furthermore, it will be clear to those skilled in the art, after reading this disclosure, how to make and use alternative embodiments of the present invention in which synchronizer 323 is executing on different hardware (i.e. on a remote server).

System software library 324 is a repository for system software program code. System software library 324 allows terminal 110 to retrieve the code for one or more system software distributions (e.g. Suse Linux, Windows XP, Windows Vista, etc.). In accordance with the illustrative embodiment of the present invention, the system software program code is stored on a remote server and system software library 324 serves as a client for the server. However, it will be clear to those skilled in the art, after reading this disclosure, how to make and use alternative embodiments of the present invention in which the program code for one or more system software distributions is stored on terminal 110. It will also be clear to those skilled in the art, after reading this disclosure, how to make and use alternative embodiments of the present invention, in which system software library 324, in addition to providing access to executable code, also provides access to information about hardware and/or software requirements of different system software distributions. For example, and without limitation, such information includes memory requirements, permanent storage requirements, compatibility with different virtualization software, and so forth.

Application library 325 is a repository for the code of one or more software applications. Application library 325 allows terminal 110 to retrieve the code for one or more software applications. In accordance with the illustrative embodiment of the present invention, the software program code is stored on a remote server and application library 325 serves as a client for the server. However, it will be clear to those skilled in the art, after reading this disclosure, how to make and use alternative embodiments of the present invention in which the program code for one or more software applications is stored on terminal 110. It will also be clear to those skilled in the art, after reading this disclosure, how to make and use alternative embodiments of the present invention, in which system application library 325, in addition to providing access to executable code, also provides access to information about hardware and/or software requirements of different software application. For example, and without limitation, such information includes memory requirements, permanent storage requirements, use of specific software (e.g. JRE, etc.), and so forth.

System software 340 is a default operating system instance which allows terminal 110 to be used when it is not synchronized with another telecommunications terminal. In accordance with the illustrative embodiment of the present invention, system software 340 is an image of the Symbian™ operating system that is running on top of virtualization layer 320. It will be clear to those skilled in the art, after reading this disclosure, how to make and use alternative embodiments of the present invention in which system software 340 is any type of system software, firmware, or software platform that is capable of executing one or more software applications, such as, for example, and without limitation, Nokia Series 40 Platform™, Nokia Series 60 Platform™, Embedded Linux, Android OS™, Linux, BlackBerry OS™, etc.

Telephony application 342 is a software application for conducting telephone conversations.

Hardware 360 is the electronic components that comprise terminal 120, such as, for example, and without limitation, processor (single-core or multi-core), memory, transceiver, network interface, display, sound interface, video interface, etc. Hardware 360 is capable of executing system software and one or more telephony applications. It will be clear to those skilled in the art how to make and use hardware 310.

System software 350 is an image of the Android™ operating system. It will be clear to those skilled in the art, after reading this disclosure, how to make and use alternative embodiments of the present invention in which system software 350 is any type of system software, firmware, or software platform that is capable of executing one or more software applications, such as, for example, and without limitation, Nokia Series 40 Platform™, Nokia Series 60 Platform™, Symbian OS™, Linux, BlackBerry OS™, etc.

Application 352 is calendar software. Application 352 stores information about appointments and plays an alarm sound when an appointment becomes due. It will be clear to those skilled in the art, after reading this disclosure, how to make and use alternative embodiments of the present invention in which application 352 is any software application (e.g. word processor, email client, a computer game, media player, etc.).

Application 353 is an email client.

Application 354 is a telephony application.

Personal data 351 is a collection of information that is personal to the user of terminal 120. In accordance with the illustrative embodiment of the present invention, personal data 351 comprises a list of telephone numbers (e.g. a contacts list) and a set of emails that have been received at terminal 120. However, it will be clear to those skilled in the art, after reading this disclosure, how to make and use alternative embodiments of the present invention in which personal data 351 includes one or more files that have been created and/or edited by the user of terminal 120 (e.g. photographs, word documents, etc.). And still furthermore, it will be clear to those skilled in the art, after reading this disclosure, how to make and use alternative embodiments of the present invention in which personal data 351 comprises any information that has been stored by the user on terminal 120 (e.g. music files, call log, Internet chat logs, etc.).

Figure 4:
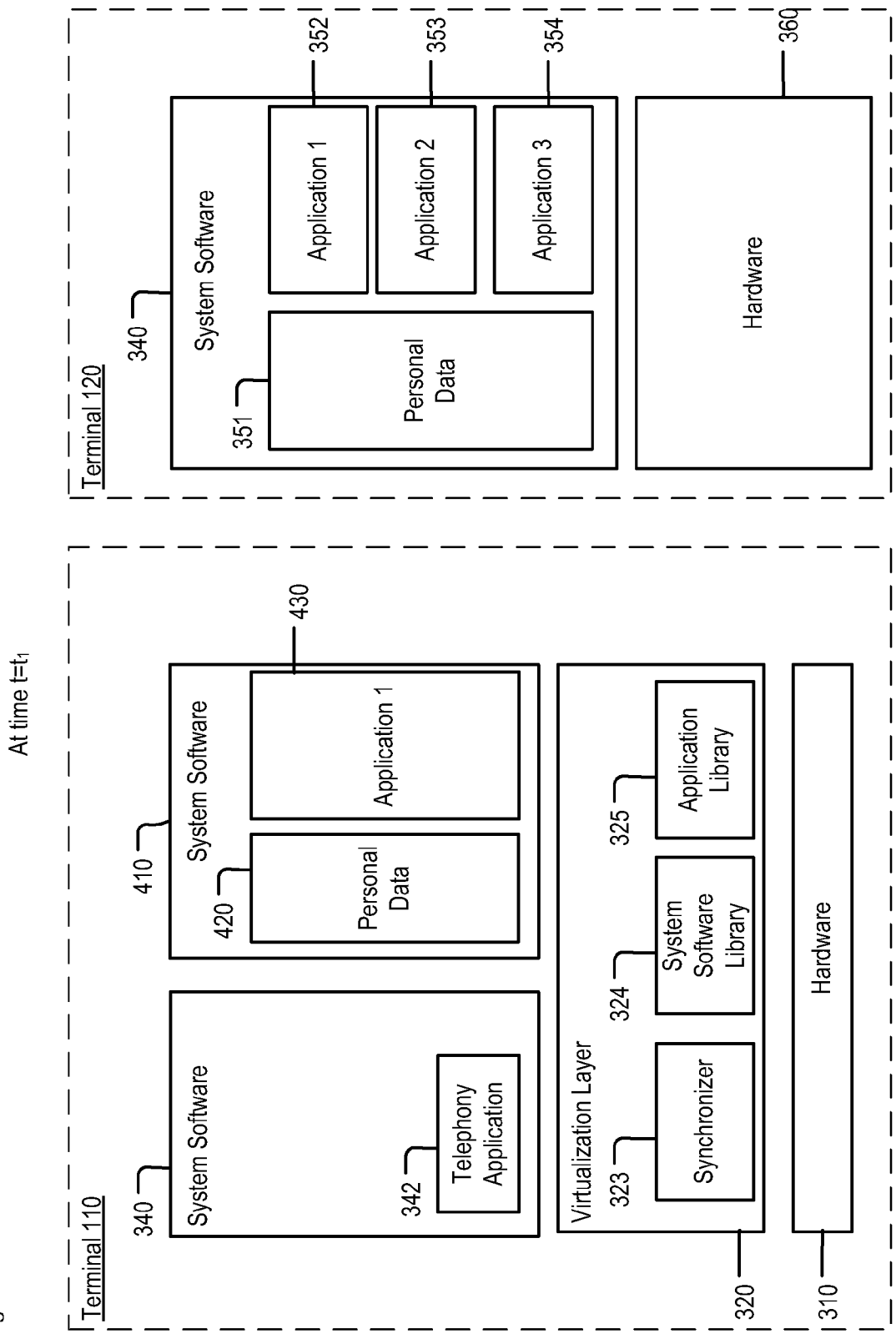
FIG. 4 depicts a schematic diagram of the salient components of the illustrative embodiment of the present invention.

FIG. 4 depicts a schematic diagram of the salient components of the illustrative embodiment of the present invention. The illustrative embodiment comprises system software 340, virtualization layer 320, hardware 310, telephony application 342, synchronizer 323, system software library 324, application library 325, system software 350, hardware, 360, personal data 351, application 352, application 353, application 354, system software 410, personal data 420, and application 430.

FIG. 4 depicts terminals 110 and 120 after they are synchronized.

System software 410 is an instance of a system software that shares a common characteristic with system software 340. In accordance with the illustrative embodiment of the present invention, system software 410 and system software 340 are instances of the same system software. However, it will be clear to those skilled in the art, after reading this disclosure, how to make and use alternative embodiments of the present invention in which system software 410 and system software 340 are instances of different software that share a common characteristic. For example, and without limitation, the two system software instances may have the same kernel, but different versions of a library. Or the two system software may support the .Net™ framework, but, apart from that, be entirely different operating systems.

Personal data 420 is a collection of information that is personal to the user of terminal 120. In accordance with the illustrative embodiment of the present invention, personal data 420 comprises the list of telephone numbers that is included in personal data 351. Thus, in the illustrative embodiment of the present invention, the information which personal data 420 comprises is a subset of the information of personal data 351. However, it will be clear to those skilled in the art, after reading this disclosure, how to make and use alternative embodiments of the present invention in which the content of personal data 420 is identical to the content of personal data 351.

Application 430 is an instance of a software application that shares a common characteristic with application 352. In accordance with the illustrative embodiment of the present invention, application 430 is an instance of the same software as application 352. However, it will be clear to those skilled in the art, after reading this disclosure, how to make and use alternative embodiments of the present invention in which application 430 and 352 are instances of different software applications.

Figure 5:
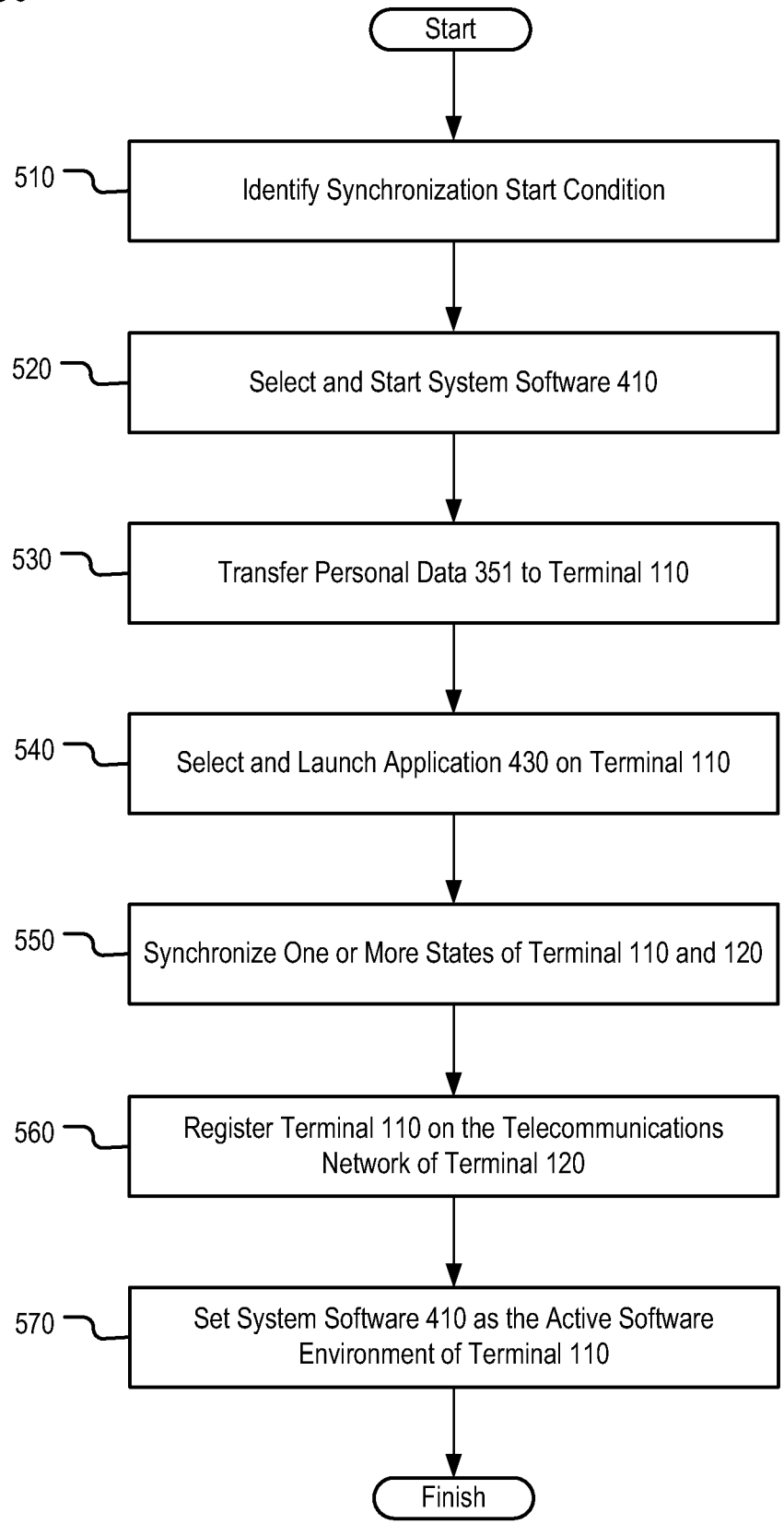
FIG. 5 depicts a flowchart of the execution of the salient tasks associated with the operation of the illustrative embodiment of the present invention.

FIG. 5 depicts a flowchart of the execution of the salient tasks associated with the operation of the illustrative embodiment of the present invention. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, synchronizer 323 identifies a condition which indicates that the synchronization of terminal 110 and terminal 120 should begin. In accordance with the illustrative embodiment of the present invention, the condition is the receipt of user input at terminal 110. However, it will be clear to those skilled in the art, after reading this disclosure, how to make and use alternative embodiments of the present invention in which the condition is the presence of terminal 120 in proximity to terminal 110. In accordance with the alternative embodiment of the present invention, synchronizer 323 uses radio frequency ID (RFID) to identify that terminal 120 is located in proximity to terminal 110. However, it will be clear to those skilled in the art, after reading this disclosure, how to make and use alternative embodiments of the present invention in which synchronizer 323 uses an alternative technology, such as, for example, and without limitation, Bluetooth (e.g. by detecting an identifier that is broadcast by the Bluetooth module of the cellular telephone of the user, etc.), location signal (e.g. Global Positioning System (GPS) signal), and others.

At task 520, terminal 110 selects and starts system software 410. Task 520 is further described in the discussion with respect to FIG. 6.

At task 530, personal data 420 is transferred from terminal 120 to terminal 110. In accordance with the illustrative embodiment of the present invention, the data transfer is accomplished by using Bluetooth technology, but it will be clear to those skilled in the art, after reading this disclosure, how to make and use alternative embodiments of the present invention in which any wireless or wired technology is used (e.g. Universal Serial Bus (USB), Wi-Fi, etc.)

At task 540, synchronizer 323 selects and launches application 430 on terminal 110. Task 540 is further described in the discussion with respect to FIG. 7.

At task 550, synchronizer 323 synchronizes the states of terminal 110 and terminal 120. In accordance with the illustrative embodiment of the present invention, synchronizer 323 aligns the states of system software 340 and system software 410, as well as, application 352 and application 430. However, it will be clear to those skilled in the art, after reading this disclosure, how to make and use alternative embodiments of the present invention in which synchronizer 323 aligns the state of only one of the system software instances and the application instances. Task 550 is further described in the discussion with respect to FIG. 8.

At task 560, terminal 110 registers on the Session Initiation Protocol (SIP) network of terminal 120. In accordance with the illustrative embodiment of the present invention, after the registration is complete, terminal 110 becomes registered as an endpoint for the Session Initiation Protocol (SIP) uniform resource identifier (URI) that is also used by terminal 120. After the registration is complete, in accordance with the illustrative embodiment of the present invention, both terminal 120 and terminal 110 can be used in parallel to answer telecommunications made to the uniform resource identifier (URI). However, it will be clear to those skilled in the art, after reading this disclosure, how to make and use alternative embodiments of the present invention in which the registration of terminal 120 as an endpoint for the uniform resource identifier (URI) is discontinued after the registration of terminal 110 is complete.

At task 570 synchronizer 323 sets system software 410 as the active software environment of terminal 110. In particular, synchronizer 323 invokes one or more system calls provided by virtualization layer 320 in order to set the selected software environment as the active environment on terminal 110. For the purposes of this specification, the term "active software environment" is defined as:
  (i) a system software instance whose user interface is visible on the display screen of a terminal; or
  (ii) a system software instance that is executing a software application whose (the software application's) interface is visible on the display screen of a terminal; or
  (iii) any combination of i and ii.

Figure 6:
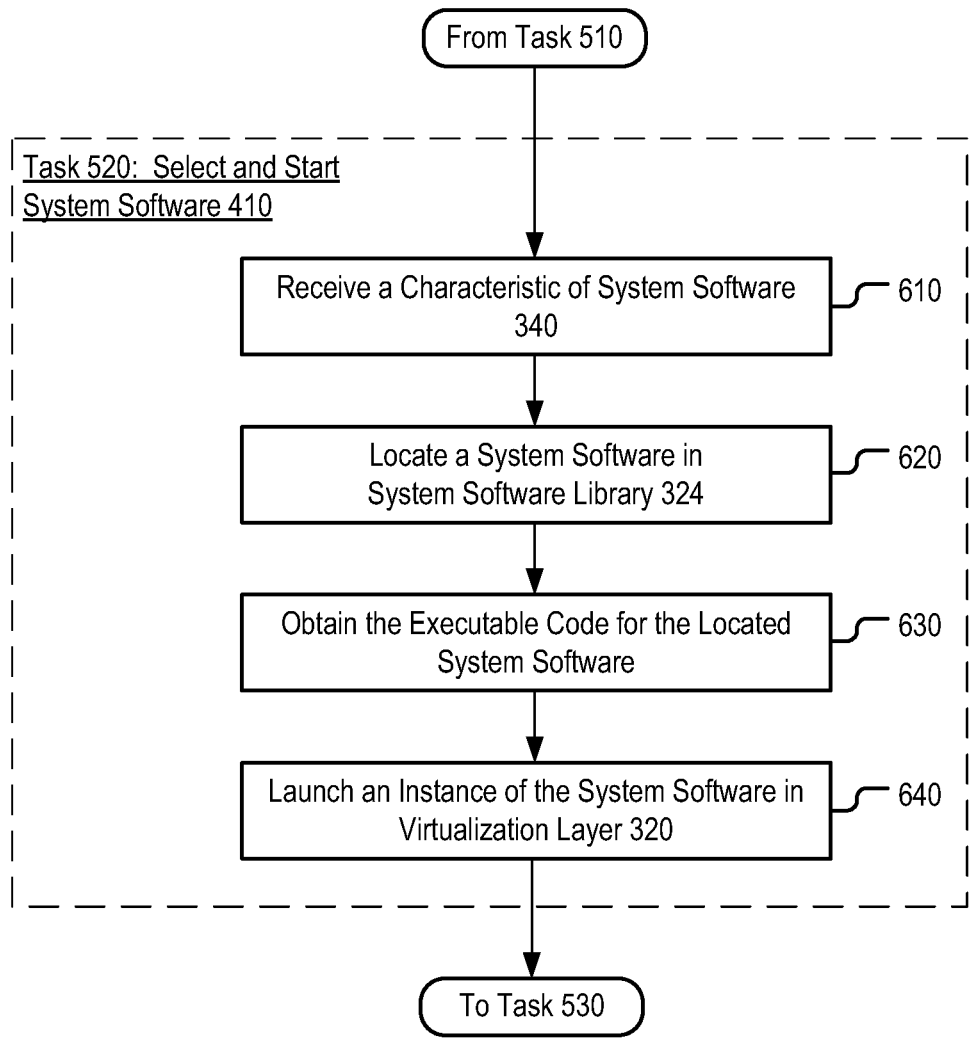
FIG. 6 depicts a flowchart of the execution of the salient subtasks associated with the performance of task 520.

FIG. 6 depicts a flowchart of the execution of the salient subtasks associated with the performance of task 520. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, terminal receives a characteristic of system software. In accordance with the illustrative embodiment of the present invention, the characteristic is the name and version number of system software 340 (e.g. Windows 3.1). However, it will be clear to those skilled in the art, after reading this disclosure, how to make and use alternative embodiments of the present invention in which another characteristic is received. For example, and without limitation, characteristics of system software are:
  (i) kernel version number; or
  (ii) developer identification (e.g. Microsoft, Nokia, etc.); or
  (iii) ability to run specific software (e.g. both Windows and Mac OS can run Word, but Linux cannot); or
  (iv) ability to execute a specific software library (e.g. OpenGL, DirectX, Qt); or
  (v) support for specific hardware (e.g. cpu, networking interface, etc.); or
  (vi) support for specific windowing environment; or
  (vii) scheduling algorithm information; or
  (viii) information about scheduling priorities of different applications; or
  (ix) any combination of i, ii, iii, iv, v, vi, vii, and vii.

In accordance with the illustrative embodiment of the present invention, terminal 110 receives the characteristic from terminal 120, but it will be clear to those skilled in the art, after reading this disclosure, how to make and use alternative embodiments of the present invention in which terminal 120 receives the indication of a characteristic from server 230.

At task 620, synchronizer 323 uses system software library 224 to locate executable code for system software that possesses the characteristic received at task 510. In accordance with the illustrative embodiment of the present invention, synchronizer 323 generates a query that identifies the characteristic and submits the query to system software library 224. In response to the query, system software library 224 identifies one or more addresses from where executable code for software that matches the query can be downloaded.

At task 630, synchronizer 323 downloads the executable code for system software that is identified by system software library 224. In accordance with the illustrative embodiment of the present invention, the executable code is retrieved from the location identified by system software library 224. Furthermore, it will be clear to those skilled in the art, after reading this disclosure, how to make and use alternative embodiments of the present invention in which synchronizer 323 selects a system software distribution from the results returned by system software library 323 on the basis of the system's software hardware requirements. In this way, synchronizer 223 ensures that selected system software will run adequately on the hardware of terminal 110.

At task 640, system software executes the code retrieved at task 630 on top of virtualization layer 320 to launch system software 410. It will be clear to those skilled in the art how to launch a system software instance in a virtualized environment.

Figure 7:
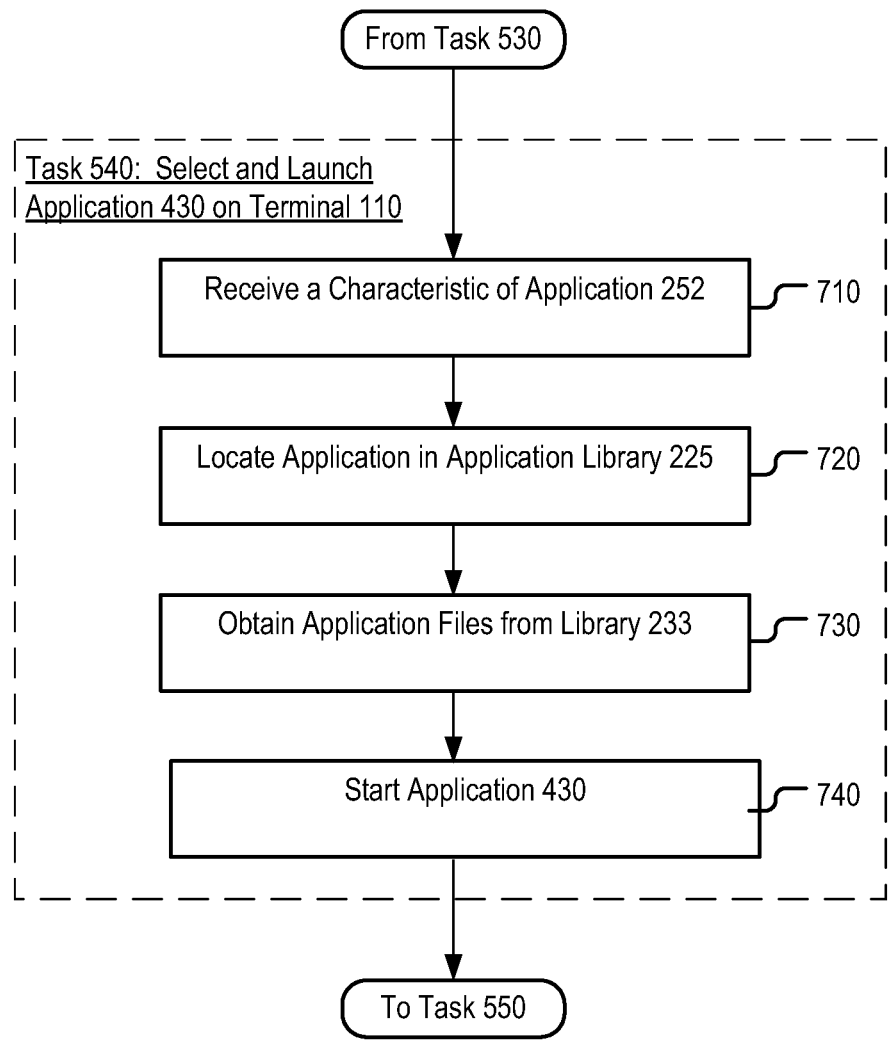
FIG. 7 depicts a flowchart of the execution of the salient subtasks associated with the performance of task 540.

FIG. 7 depicts a flowchart of the execution of the salient subtasks associated with the performance of task 540. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks.

At task 710, terminal 110 receives a characteristic of an application. In accordance with the illustrative embodiment of the present invention, terminal 110 receives the title and version number of application 352. However, it will be clear to those skilled in the art, after reading this disclosure, how to make and use alternative embodiments of the present invention in which another characteristic is received. For example, and without limitation, characteristics of a software application are:

(i) the function performed by the application (e.g. word processor, spreadsheet editor, instant messaging client, etc.); or (ii) compatibility with a specific operating system (e.g. Microsoft, Nokia, etc.); or (iii) whether the application is executable by a specific runtime environment (e.g. the Java Runtime Environment, .Net runtime environment, etc.); or (iv) whether the application requires a specific library to be supported by the system software inside which the application is to execute (e.g. DirectX, OpenGL, etc.); or (v) the application's hardware requirements (e.g. web camera, minimum amount of memory needed, maximum amount of memory needed, etc.); or (vi) any combination of i, ii, iii, iv, and v.

In accordance with the illustrative embodiment of the present invention, terminal 110 receives the characteristic from terminal 120, but it will be clear to those skilled in the art, after reading this disclosure, how to make and use alternative embodiments of the present invention in which terminal 120 receives an indication of the characteristic from server 230. Although in accordance with the illustrative embodiment of the present invention, terminal 110 receives a characteristic of a software application that is executing, it will be clear to those skilled in the art, after reading this disclosure, how to make and use alternative embodiments of the present invention in which terminal 110 receives a characteristic of an application that is available for execution, such as an application that is installed on terminal 120, but is not running at the time task 710 is executed.

At task 720, synchronizer 323 uses application library 325 to locate executable code for an application that possesses the characteristic received at task 710. In accordance with the illustrative embodiment of the present invention, synchronizer 323 generates a query that identifies the characteristic and submits the query to application library 325. In response to the query, application library 325 identifies one or more software applications that match the query and provides synchronizer 323 with the addresses of the locations from where the executable code for the applications can be downloaded.

At task 730, synchronizer 323 downloads executable code for an application that is identified by application library 325. It will be clear to those skilled in the art, after reading this disclosure, how to make and use alternative embodiments of the present invention in which synchronizer 323 selects a software application to download (out of the pool of applications identified by application library 325) based on the application's hardware requirements. In this way, synchronizer 223 ensures that selected software application will run adequately on the hardware of terminal 110.

At task 740, system software 410 executes the code retrieved at task 630 to instantiate application 430.

Figure 8:
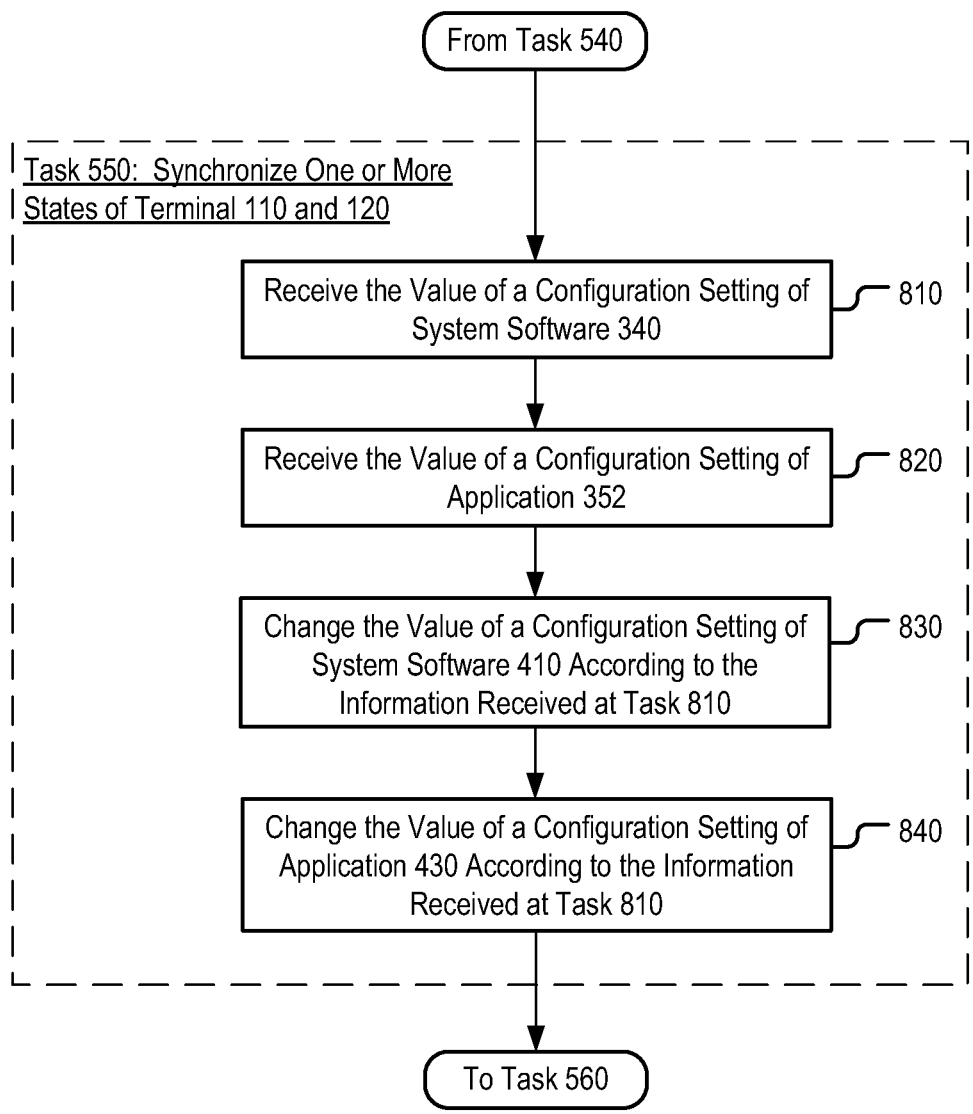
FIG. 8 depicts a flowchart of the execution of the salient subtasks associated with the performance of task 550.

FIG. 8 depicts a flowchart of the execution of the salient subtasks associated with the performance of task 550. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

At task 810, terminal 110 receives the value of a configuration setting for system software 340. In accordance with the illustrative embodiment of the present invention, the configuration setting is the address of the default domain name service (DNS) server that is used by system software 340. However, it will be clear to those skilled in the art, after reading this disclosure, how to make and use alternative embodiments of the present invention in which any information concerning the network settings of system software 340 is received (e.g. firewall policies identification of encryption algorithms used by the terminal, networking interface settings, etc.). Furthermore, it will be clear to those skilled in the art, after reading this disclosure, how to make and use alternative embodiments of the present invention in which any information concerning the configuration settings of software 340 is received by terminal 110. For example, and without limitation, such information includes:

(i) information about the configuration of storage which terminal 110 uses (e.g. partitions to which system software has access, file systems supported, number of system services running, etc.); or (ii) information about the windowing environment used by terminal 110 (e.g. theme of windowing environment, version of windowing environment used, name of a picture file used as a screen background, etc.); or (iii) information about different user and/or user group accounts (e.g. account names, access privileges); or (iv) identification of what system modules are loaded at boot time; or (v) device driver settings; or (vi) information about security policies implemented by system software 340 (e.g. file permissions, blocked file extensions, etc.); or (vii) information about the configuration of different hardware and/or peripheral devices (e.g. screen resolution of a video adapter, maximum transfer rate of a network adapter, speaker volume settings, sound adapter equalizer settings, microphone volume settings etc.); or (viii) information about any other configuration setting of system software 340; or (ix) any combination of i, ii, iii, iv, v, vi, vii, and viii.

In accordance with the illustrative embodiment of the present invention, terminal 110 receives one or more copies of configuration files that are used by system software 340 (e.g. host.conf in the context of Linux). However, it will be clear to those skilled in the art, after reading this disclosure, how to make and use alternative embodiments of the present invention in which terminal 110 extracts items of information from data records that are used by system software 340 and transmits the extracted information to terminal 110. Furthermore, it will be clear to those skilled in the art, after reading this disclosure, how to make and use alternative embodiments of the present invention in which terminal 120 transmits information to terminal 110 that is contained in random access memory of terminal 120 that has been allocated to system software 410 (e.g. number of processes executing on the terminal, a change to a configuration setting that has been entered by the user of terminal 120, but not saved yet etc.).

At task 820, terminal 110, receives the value of a configuration setting for application 352. In accordance with the illustrative embodiment of the present invention, the received information is an identification of an alarm sound that is played when an appointment becomes due (e.g. filename of sound file, alphanumerical string that the distinguishes the sound from other sounds, etc.). It will be clear to those skilled in the art, after reading this disclosure, how to make and use alternative embodiments of the present invention in which any kind of configuration information for a software application is received by terminal 110, such as, for example, and without limitation, a list of Internet bookmarks, information about preferred fonts, information about preferred font sizes, information about default colors, information about content of different graphical user interface (GUI) toolbars, identification of what graphical user interface (GUI) toolbars are made visible, information about where document templates are stored, etc.

In accordance with the illustrative embodiment of the present invention, terminal 110 receives one or more copies of configuration files that are used by application 352. However, it will be clear to those skilled in the art, after reading this disclosure, how to make and use alternative embodiments of the present invention in which terminal 120 extracts information from data records that are used by application 352 and transmits the extracted information to terminal 110. Furthermore, it will be clear to those skilled in the art, after reading this disclosure, how to make and use alternative embodiments of the present invention in which terminal 120 transmits information to terminal 110 that is contained in random access memory of terminal 120 that has been allocated to the software application (e.g. content of input buffers, information that has been entered into the application, but not saved yet, etc.).

Furthermore, in accordance with the illustrative embodiment of the present invention, the configuration information is transmitted by terminal 120. However, it will be clear to those skilled in the art, after reading this disclosure, how to make and use alternative embodiments of the present invention in which the configuration information is transmitted by server 230.

At task 830, terminal 110 changes the value of a configuration setting of system software 410. In accordance with the illustrative embodiment of the present invention, terminal 110 configures system software 410 to use the same default domain name service (DNS) server as system software 340. Thus, in accordance with the illustrative embodiment of the present invention, the value of the configuration setting of system software 410 is made equal to the value of the configuration setting of system software 340. However, it will be clear to those skilled in the art, after reading this disclosure, how to make and use alternative embodiments of the present invention, in which the new value of the configuration setting of system software 410 also depends on the value of the configuration setting of system software 310, but falls short of being the same. For example, and without limitation, in a situation in which the configuration setting is screen resolution, the screen resolution of system software 410 may be set to a value that is close to the resolution of system software 340, but is more suitable for the aspect ratio of the screen of terminal 110.

At task 840, terminal 110 changes the value of a configuration setting of application 430. In accordance with the illustrative embodiment of the present invention, terminal 110 sets application 430 to use the same alarm sound as application 352. In accordance with the illustrative embodiment of the present invention, the value of the configuration setting of application 430 is made to be equal to the value of the configuration setting of system application 352. However, it will be clear to those skilled in the art, after reading this disclosure, how to make and use alternative embodiments of the present invention in which the new value of the configuration setting of application 430 also depends on the value of the configuration setting of application 352, but falls short of being the same. For example, and without limitation, in a situation in which the configuration setting is the font type used to display menus of application 352, application 430 may not support the exact same font. In this situation, it will select a font that is the closest, from a visual standpoint, to the font used by application 352. As another example, terminal 110 can select an alarm that has similar pitch to the alarm tone of application 352, but is a different sound.

Figure 9:
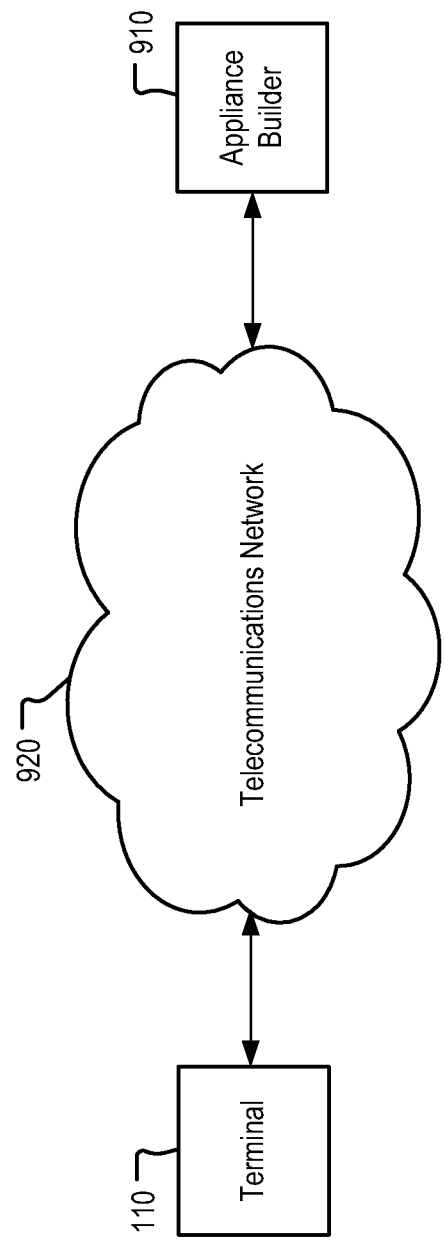
FIG. 9 depicts a schematic diagram of the salient components of a second illustrative embodiment of the present invention.

FIG. 9 depicts a schematic diagram of the salient components of a second illustrative embodiment of the present invention. The illustrative embodiment comprises terminal 110, telecommunications network 920, and appliance builder 910.

In the second illustrative embodiment of the present invention, terminal 110 receives and executes a virtual appliance that is configured to resemble the software environment of terminal 120. In accordance with the second illustrative embodiment of the present invention, the execution of the virtual appliance causes the instantiation of system software 410 and application 430.

Appliance builder 910 is a virtual appliance builder. It comprises computer hardware (e.g. processor, memory, network interface, etc.) and software for generating virtual appliances. The hardware of appliance builder 910 is configured to execute the software for generating virtual appliances. In accordance with the second illustrative embodiment of the present invention, appliance builder generates a virtual appliance which comprises system software 410, personal data 420, and application 430. After generating the appliance, appliance builder 910 transmits it to terminal 110. Terminal 110 receives the appliance and executes it on top of virtualization layer 320.

Telecommunications network 920 transports signals between terminal 110 and appliance builder 910. In accordance with the second illustrative embodiment of the present invention, telecommunications network 920 is the Internet, but it will be clear to those skilled in the art, after reading this disclosure, how to make and use alternative embodiments of the present invention in which telecommunications network 920 is any type of telecommunications network (e.g. local area network, the Public Switched Telephone Network, SONET, ATM, cellular network, etc.).

FIG. 10 depicts a flowchart of the execution of the salient tasks associated with the operation of the illustrative embodiment of the present invention. It will be clear to those skilled in the art, after reading this disclosure, how to perform the tasks associated with FIG. 10 in a different order than represented or to perform one or more of the tasks concurrently. Furthermore, it will be clear to those skilled in the art, after reading this disclosure, how to make and use alternative embodiments of the present invention that omit one or more of the tasks.

At task 1010, synchronizer 323 identifies a condition which indicates that the synchronization of terminal 110 and terminal 120 should begin. Task 1010 is identical to task 510.

At task 1020, terminal 110 receives information from terminal 120. Task 1020 is further described in the discussion with respect to FIG. 11.

At task 1030, terminal 110 transmits the information received at task 1020 to appliance builder 910. In accordance with the second illustrative embodiment of the present invention, terminal 110 transmits the full set of information which it received at task 1020. However, it will be clear to those skilled in the art, after reading this disclosure, how to make and use alternative embodiments of the present invention in which terminal 110 transmits a subset of the information. In one alternative embodiment of the present invention, terminal 110 transmits information about a characteristic of system software 340. In another embodiment of the present invention, terminal 110 transmits information about a characteristic of application 352. In a third alternative embodiment of the present invention, terminal 110 transmits to appliance builder 910 some or all of the personal information received at task 1020.

At task 1040, appliance builder 910 selects an operating system for the virtual appliance. In accordance with the second illustrative embodiment of the present invention, appliance builder 910 selects system software that possess the characteristic received at task 1110. Furthermore, in accordance with the illustrative embodiment of the present invention, appliance builder uses a software repository, such as system software library 324, to locate and retrieve the code for the system software instance that possesses the system software characteristic. Although, in accordance with the illustrative embodiment of the present invention, the repository is located on a remote server, it will be clear to those skilled in the art, after reading this disclosure, how to make and use alternative embodiments of the present invention in which the repository is located on the same physical device as appliance builder 910.

At task 1050, appliance builder selects an application that possesses the application characteristic received at task 1120 to the virtual appliance. Furthermore, in accordance with the illustrative embodiment of the present invention, appliance builder uses a software repository, such as system application library 325, to locate and retrieve the code for the software application that possesses the system software characteristic received at task 1020. Although, in accordance with the illustrative embodiment of the present invention, the repository is located on a remote server, it will be clear to those skilled in the art, after reading this disclosure, how to make and use alternative embodiments of the present invention in which the repository is located on the same physical device as appliance builder 910.

After the application is selected, appliance builder generates a virtual appliance that is based on the operating system selected at task 1040 and contains the application selected at task 1050.

At task 1060, appliance builder 910 changes the value of a configuration setting of the operating system of the virtual appliance. In accordance with the illustrative embodiment of the present invention, appliance builder 910 configures the system software of the virtual appliance to use the same default domain name service (DNS) server as system software 340. Thus, in accordance with the illustrative embodiment of the present invention, the value of the configuration setting of system software 410 is made equal to the value of the configuration setting of system software 340. However, it will be clear to those skilled in the art, after reading this disclosure, how to make and use alternative embodiments of the present invention, in which the new value of the configuration setting of the operating system of the virtual appliance depends on the value of the configuration setting of system software 310, but falls short of being the same. For example, and without limitation, in a situation in which the configuration setting is screen resolution, the screen resolution of the virtual appliance may be set to a value that is close to the resolution of system software 340, but is more suitable for the aspect ratio of the screen of terminal 110 than the screen resolution of system software 410.

Although, in accordance with the illustrative embodiment of the present invention, only the operating system of the virtual appliance is configured, it will be clear to those skilled in the art, after reading this disclosure, how to make and use alternative embodiments of the present invention in which the software application which is selected at task 1050 is also configured. In these embodiments of the present invention, the configuration of the software application is conducted in the manner described in the discussion with respect to task 840.

Additionally, in accordance with the illustrative embodiment of the present invention, appliance builder 910 adds the personal data received at task 1020 to the virtual appliance.

At task 1070, appliance builder 910 transmits the virtual appliance to terminal 110.

At task 1080, terminal 110 receives the virtual appliance.

At task 1090, terminal 110 launches the virtual appliance on top of virtualization layer 320. The launching of the virtual appliance causes the instantiation of system software 410 and application 430.

Figure 11:
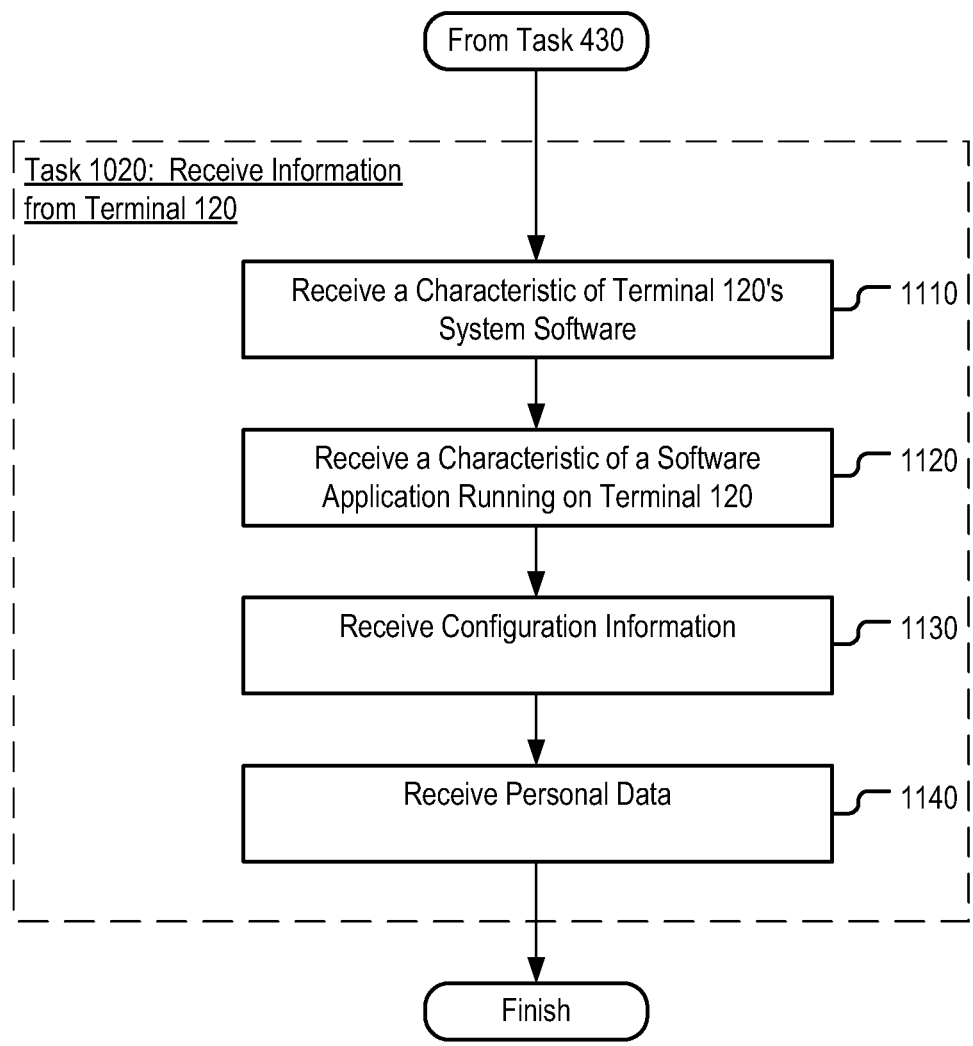
FIG. 11 depicts a flowchart of the execution of the salient subtasks associated with the performance of task 1020.

FIG. 11 depicts a flowchart of the execution of the salient subtasks associated with the performance of task 1020. It will be clear to those skilled in the art, after reading this disclosure, how to perform the tasks associated with FIG. 11 in a different order than represented or to perform one or more of the tasks concurrently. Furthermore, it will be clear to those skilled in the art, after reading this disclosure, how to make and use alternative embodiments of the present invention that omit one or more of the tasks.

At task 1110, terminal receives a characteristic of system software. In accordance with the illustrative embodiment of the present invention, the characteristic is of system software 340. Task 1110 is identical to task 610.

At task 1120, terminal 110 receives a characteristic of an application. In accordance with the illustrative embodiment of the present invention, the characteristic is of application 352. Task 1120 is identical to task 710.

At task 1130, personal data 420 is transferred from terminal 120 to terminal 110. Task 1130 is identical to task 530.

At task 1130, terminal 110 receives the value of a configuration setting of system software 340. Task 1130 is identical to task 810.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, at a first device having stored thereon (i) a plurality of mobile operating systems comprising a first mobile operating system and (ii) a first application, an identification indicating a second device is within a proximity threshold of the first device, wherein the second device is running a second application on a second mobile operating system;
   receiving, at the first device, a first indication that the second mobile operating system El has an ability to execute a specific software library, and (ii) uses a specific theme of a windowing environment;
   identifying the first mobile operating system stored at the first device as (i) having the ability to execute the specific software library, and (ii) using the specific theme, wherein the first mobile operating system and the second mobile operating system are of one of different operating system types or different operating system versions;
   launching, at the first device, a virtual instance of the first mobile operating system such that the first device and the second device run different mobile operating systems from each other;
   receiving, at the first device, a second indication that the second application requires access to the specific software library;
   identifying the first application stored at the first device as requiring access to the specific software library;
   launching, at the first device, the first application on the virtual instance of the first mobile operating system;
   receiving, at the first device, a configuration setting of the second application;
   based on the configuration setting, synchronizing a state of the first application with the second application; and
   synchronizing one or more states of the first device and the second device.

2. The method of claim 1, wherein a characteristic of the second mobile operating system relates to a screen background used by the second mobile operating system, and wherein the first mobile operating system is identified as matching the characteristic.

3. The method of claim 1, wherein a characteristic of the second mobile operating system relates to an ability run specific software, and wherein the first mobile operating system is identified as matching the characteristic.

4. The method of claim 1, wherein a characteristic of the second mobile operating system relates to an ability to support for specific hardware, and wherein the first mobile operating system is identified as matching the characteristic.

5. The method of claim 1, wherein the characteristic of the second mobile operating system is received from the second device.

6. A system comprising:
   a processor; and
   a computer-readable storage medium storing instructions which, when executed by the processor, cause the processor to perform operations comprising:
   receiving, at a first device having stored thereon (i) a plurality of mobile operating systems comprising a first mobile operating system and (ii) a first application, an identification indicating a second device is within a proximity threshold of the first device, wherein the second device is running a second application on a second mobile operating system;
   receiving, at the first device, a first indication that the second mobile operating system (i) has an ability to execute a specific software library, and (ii) uses a specific theme of a windowing environment;
   identifying the first mobile operating system stored at the first device as (i) having the ability to execute the specific software library, and (ii) using the specific theme, wherein the first mobile operating system and the second mobile operating system are of one of different operating system types or different operating system versions;
   launching, at the first device, a virtual instance of the first mobile operating system such that the first device and the second device run different mobile operating systems from each other;
   receiving, at the first device, a second indication that the second application requires access to the specific software library;
   identifying the first application stored at the first device as requiring access to the specific software library;
   launching, at the first device, the first application on the virtual instance of the first mobile operating system;
   receiving, at the first device, a configuration setting of the second application;
   based on the configuration setting, synchronizing a state of the first application with the second application; and
   synchronizing one or more states of the first device and the second device.

7. The system of claim 6, wherein a characteristic of the second mobile operating system relates to a screen background used by the second mobile operating system, and wherein the first mobile operating system is identified as matching the characteristic.

8. The system of claim 6, wherein a characteristic of the second mobile operating system relates to an ability run specific software, and wherein the first mobile operating system is identified as matching the characteristic.

9. The system of claim 6, wherein a characteristic of the second mobile operating system relates to an ability to support for specific hardware, and wherein the first mobile operating system is identified as matching the characteristic.

10. The system of claim 6, wherein the characteristic of the second mobile operating system is received from the second device.

11. A computer-readable storage device storing instructions which, when executed by a processor, cause the processor to perform operations comprising:
    receiving, at a first device having stored thereon (i) a plurality of mobile operating systems comprising a first mobile operating system and (ii) a first application, an identification indicating a second device is within a proximity threshold of the first device, wherein the second device is running a second application on a second mobile operating system;
    receiving, at the first device, a first indication that the second mobile operating system (i) has an ability to execute a specific software library, and (ii) uses a specific theme of a windowing environment;
    identifying the first mobile operating system stored at the first device as (i) having the ability to execute the specific software library, and (ii) using the specific theme, wherein the first mobile operating system and the second mobile operating system are of one of different operating system types or different operating system versions;

launching, at the first device, a virtual instance of the first mobile operating system such that the first device and the second device run different mobile operating systems from each other;

receiving, at the first device, a second indication that the second application requires access to the specific software library;

identifying the first application stored at the first device as requiring access to the specific software library;

launching, at the first device, the first application on the virtual instance of the first mobile operating system;

receiving, at the first device, a configuration setting of the second application;

based on the configuration setting, synchronizing a state of the first application with the second application; and synchronizing one or more states of the first device and the second device.

12. The computer-readable storage device of claim 11, wherein a characteristic of the second mobile operating system relates to a screen background used by the second mobile operating system, and wherein the first mobile operating system is identified as matching the characteristic.

13. The computer-readable storage device of claim 11, wherein a characteristic of the second mobile operating system relates to an ability run specific software, and wherein the first mobile operating system is identified as matching the characteristic.

14. The computer-readable storage device of claim 11, wherein a characteristic of the second mobile operating system relates to an ability to support for specific hardware, and wherein the first mobile operating system is identified as matching the characteristic.

* * * * *